US006958833B2

(12) United States Patent
TeWinkle

(10) Patent No.: US 6,958,833 B2
(45) Date of Patent: Oct. 25, 2005

(54) IMAGING APPARATUS WITH SELECTABLE SUBSETS OF PHOTOSENSORS

(75) Inventor: Scott L. TeWinkle, Ontario, NY (US)

(73) Assignee: Xerox Corporation, Stamford, CT (US)

( * ) Notice: Subject to any disclaimer, the term of this patent is extended or adjusted under 35 U.S.C. 154(b) by 666 days.

(21) Appl. No.: 09/797,295

(22) Filed: Mar. 1, 2001

(65) Prior Publication Data

US 2002/0122218 A1 Sep. 5, 2002

(51) Int. Cl.[7] .......................................... H04N 1/04

(52) U.S. Cl. ...................... 358/482; 358/483; 358/474; 358/486; 358/496; 250/208.1; 348/275

(58) Field of Search ................................ 358/482, 483, 358/474, 486, 496, 488; 250/206.1; 348/275, 348/307

(56) References Cited

U.S. PATENT DOCUMENTS 5,081,536 A 1/1992 Tandon et al. ......... 358/213.31
5,638,121 A 6/1997 Hosier et al. ............... 348/312
5,805,308 A * 9/1998 Tanaka et al. .............. 358/486
6,014,160 A 1/2000 Tewinkle et al. ........... 347/247
6,097,509 A * 8/2000 Masaoka .................... 358/482
6,166,831 A * 12/2000 Boyd et al. ................. 358/483
6,570,615 B1 * 5/2003 Decker et al. .............. 348/272

* cited by examiner

*Primary Examiner*—Edward Coles
*Assistant Examiner*—Heather D. Gibbs
(74) *Attorney, Agent, or Firm*—R. Hutter

(57) ABSTRACT

An image input scanner includes a linear array of photosensors to record images, such as in a digital copier or facsimile. A subset of the photosensors can be selected, depending on a particular situation, for recording images, while other photosensors are deselected. In this way, recording of "blank" image data, such as would be caused when photosensors in the array are not exposed to a sheet passing relative to the array, is avoided. In one embodiment, the array includes a plurality of local clock drivers, each clock driver controlling image data readout from a subset of photosensors. When a subset of photosensors are selected for a given situation, only the clock drivers associated with the selected photosensors are activated.

15 Claims, 4 Drawing Sheets

IMAGING APPARATUS WITH SELECTABLE SUBSETS OF PHOTOSENSORS

CROSS-REFERENCE TO RELATED APPLICATION

Cross-reference is made to the following application, assigned to the assignee hereof and being filed simultaneously herewith: IMAGING APPARATUS WITH MULTIPLE LOCAL CLOCKS FOR READOUT FROM A LARGE NUMBER OF PHOTOSENSORS, U.S. Ser. No. 09/797,297.

INCORPORATION BY REFERENCE

The present application incorporates by reference U.S. Pat. Nos. 5,081,536 and 5,638,121, assigned to the assignee hereof.

FIELD OF THE INVENTION

The present invention relates to image sensor arrays used in input scanners, such as in digital copiers or facsimile machines, or in digital cameras.

BACKGROUND OF THE INVENTION

Image sensor arrays typically comprise a linear array of photosensors which raster scan an image bearing document and convert the microscopic image areas viewed by each photosensor to image signal charges. Following an integration period, the image signal charges are amplified and transferred as an analog video signal to a common output line or bus through successively actuated multiplexing transistors.

For high-performance image sensor arrays, one possible design includes an array of photosensors of a width comparable to the width of a page being scanned, to permit one-to-one imaging generally without the use of reductive optics. In order to provide such a "full-width" array, however, relatively large silicon structures must be used to define the large number of photosensors. One technique to create such a large array is to make the array out of several butted silicon chips. In one proposed design, an array is intended to be made of 20 silicon chips, butted end-to-end, each chip having 248 active photosensors spaced at 400 photosensors per inch.

FIG. 4 is a schematic view showing a set of photosensors 10*a*–10*z* in a linear array, as would be found, for example, on a CMOS photosensitive device. The photosensors 10*a*–10*z*, which are typically in the form of photodiodes or photogates (depleted-gate photosensors), are operatively connected to a common video line 12, onto which each photosensor 10*a*–10*z* outputs a voltage representative of the light incident thereon at a particular time. As is known in the art such as in the patents incorporated by reference, each photosensor 10*a*–10*z* may further include, in addition to a photodiode, any number of ancillary devices, such as individual transfer circuits or amplifiers.

Each photosensor 10*a*–10*z* is connected to common video line 12 via an individual transistor switch, here shown as 14. The transistor switch 14 associated with the photosensor is independently controllable, for example, by application of a voltage to the gate of the transistor. Such a gate voltage closes the switch 14 so that a particular photosensor 10 may output a voltage signal onto the common video line 12 at the desired time for a coherent readout routine.

In order to read out the image signals from a sequence of photosensors 10*a*–10*z* in a manner convenient for image-processing apparatus, there is preferably associated with every transistor chip 14, a shift register, which comprises a set of what are known as "stages" 20. The stages 20 are arranged in series along a shift register line 22, and are controllable via pixel clock line 24.

According to a familiar method of operation of a shift register, each stage 20 along line 22 is capable of activating a particular transistor switch 14 associated with one photosensor 10*a*–10*z*. Ordinarily, each stage 20 "holds" a logical digital 0, unless and until there is entered into the particular stage 20 a digital 1, which is typically a one-cycle voltage pulse, along line 22. The single digital 1 is propagated along line 22, from one stage 20 to the next. When the 1 activates a particular stage 20, the associated transistor switch 14 is caused to make a connection between the associated photosensor 10 and the common video line 12. Operating the iteration of the digital 1 along line 22 is a pixel clock, in the form of a square wave of predetermined frequency apparent on line 24. This pixel clock signal $\Phi_S$ activates one stage 20 along line 22 with every on-and-off cycle thereof. In this way, the photosensors 10*a*–10*z* are activated in a coherent sequence.

In a practical embodiment of a scanner incorporating a linear array of photosensors, as shown in FIG. 4, in various situations it is not always necessary to accept image data from every photoreceptor in the array. For example, in a scanner or a facsimile machine having an effective width of 11.5 inches, the scanner is perfectly suitable for accepting long edges of standard letter size paper. However, if the scanner is used to accept the short edges of legal size paper, which is only 8.5 inches wide, fully 2.5 inches of the width of the scanner will not be exposed to the passing sheets, and thus will not be outputting useable image data. This "blank" data may simply take up space in a downstream memory. The problem is even more acute when small hard copy documents, such as index cards, are being scanned. It is one object of the present invention to provide a system whereby, particularly in a page width array of photosensors, only those photosensors which correspond to the path of a sheet passing through will output image data, while the remainder of the photosensors, which are not directed toward the original sheet, will be effectively inactivated.

DESCRIPTION OF THE PRIOR ART

U.S. Pat. Nos. 5,081,536 and 5,638,121, incorporated by reference above, respectively show an implementation of a photosensitive chip wherein each photosensor is associated with a transfer circuit, and an implementation of a shift register used to read out image signals from a set of transfer circuits.

U.S. Pat. No. 6,014,160 discloses a page-width image sensor array comprising a set of chips. During an image readout routine, individual chips are addressed to output image data at different times, so as to enable, as desired, serial or parallel signal output.

SUMMARY OF THE INVENTION

According to the present invention, there is provided a photosensitive apparatus, comprising a plurality of photosensors, the photosensors being organized in a set of groups of photosensors, and a video output line, for accepting image-related video signals from the photosensors. Selection means activate a subset of groups of photosensors so that only the activated subset of groups of photosensors outputs image signals onto the video output line to record an image.

According to another aspect of the present invention, there is provided an apparatus for recording images from a sheet, comprising a linear array of photosensors and means for moving a sheet relative to the linear array of photosensors. A subset of photosensors in the linear array can be selected for recording an image on the sheet.

DETAILED DESCRIPTION OF THE INVENTION

Figure 1:
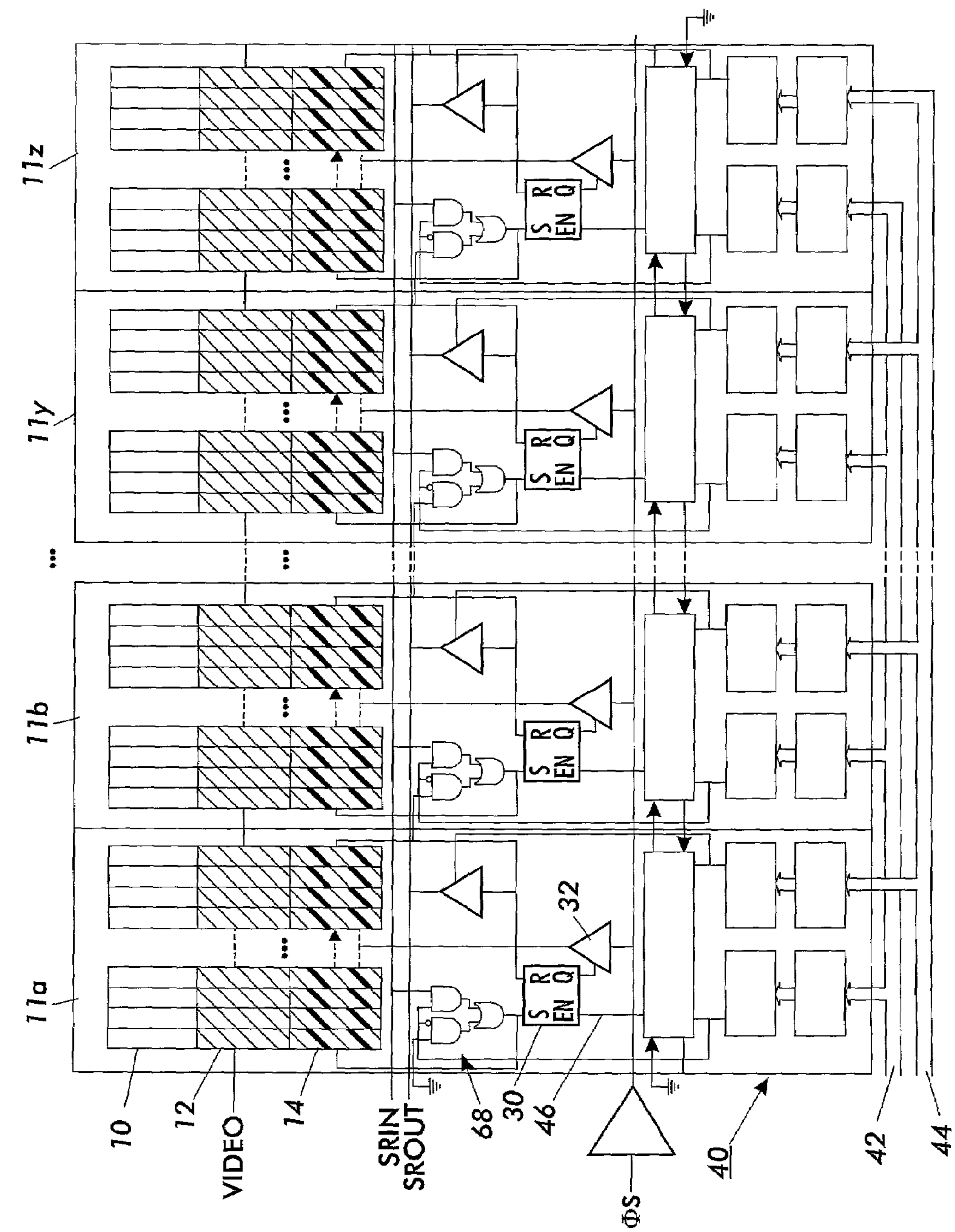
FIG. 1 is a schematic diagram of a photosensitive device incorporating the present invention.

FIG. 1 is a diagram showing the essential elements of the present invention as they relate to a photosensitive device in which a linear array of photosensors output image-related signals onto a video line. Although a single linear array of the photosensors is shown in the Figure, the basic principle can further apply to devices having, for example, three linear arrays of photosensors, each array being filtered to be sensitive to one primary color; or, alternately, a device suitable for recording two-dimensional images. The structure shown in FIG. 1 may reside on a single silicon chip or over several such chips, such as in a full-page-width scanner.

Figure 4:
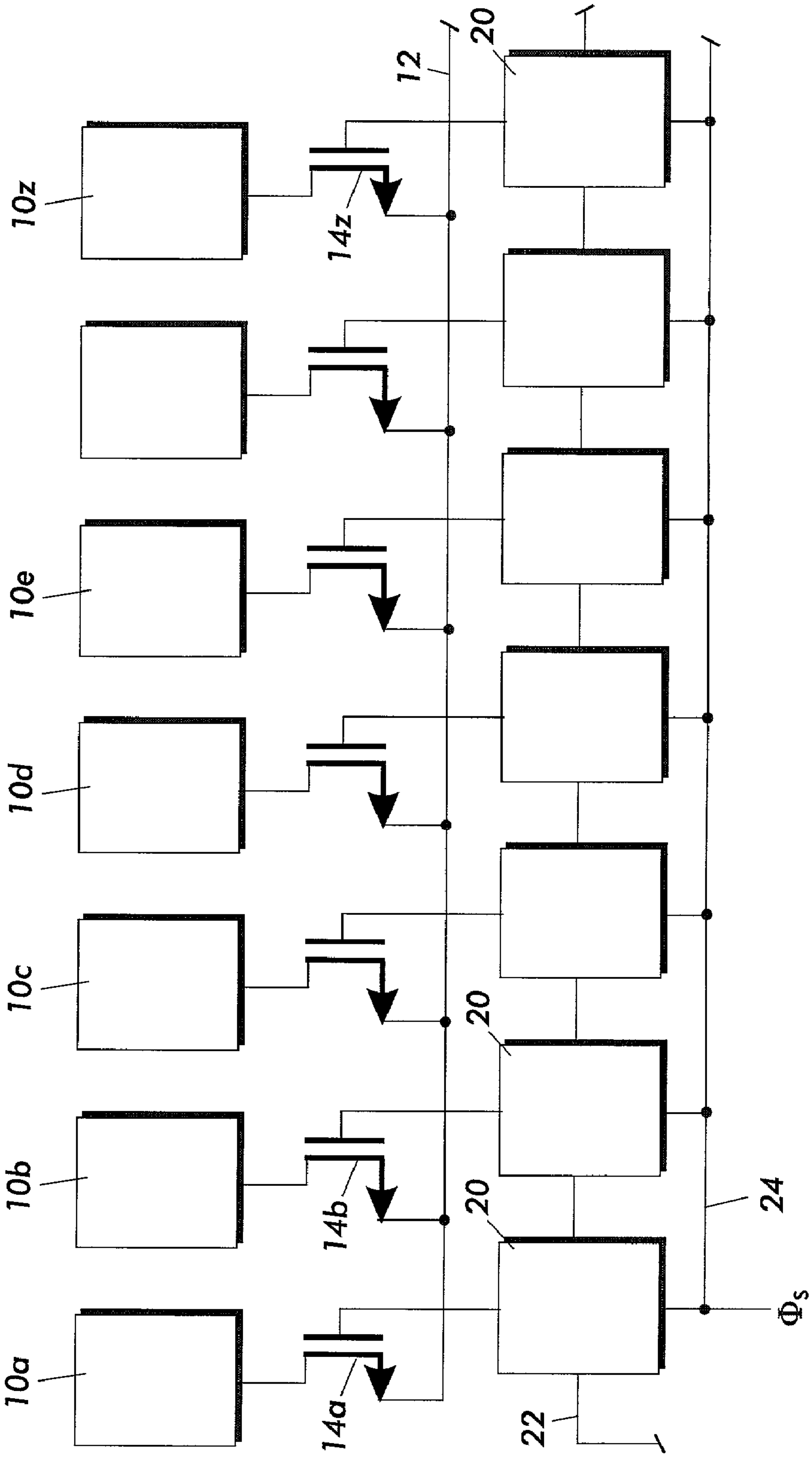
FIG. 4 shows the basic principle of using a shift register to read out image signals from a series of transfer circuits associated with a set of photosensors, as known in the prior art.

The device in FIG. 1 includes a linear array of photosensors, which can be, for instance, either photodiodes or photogates, and these photosensors are generally indicated as 10. Associated with each photosensor 10 is a transfer circuit generally indicated in each case as 14, which can be of any of a variety of configurations known in the art. What is important is that each transfer circuit 14, when activated, outputs a video signal ultimately derived from its associated photosensor onto a video line 12. Further associated with each transfer circuit 14 is a shift register stage, generally indicated as 20. The shift register stages are disposed in series on a shift register line 22. As described above in the simple case of FIG. 4, a digital 1 is in effect handed off from one stage 20 to the next in sequence, and when this digital 1 enters a particular shift register stage 20, the stage 20 activates its associated transfer circuit 14, causing that transfer circuit 14 to output a signal onto video line 12. In brief, by having the digital 1 move across the device from one stage 20 to the next, the various transfer circuits 14 are sequentially activated, thereby yielding a sequential outputting of video signals from the various transfer circuits 14 onto the video line 12.

In the illustrated embodiment, there is provided, within a single device, multiple local "clock drivers," each clock driver being a small circuit which operates only a relatively small subset of shift register stages 20 in the entire device. In other words, instead of having a single shift register such as 24 directly operate every shift register stage on a device, the function of activating the shift register stages 20 is divided among a series of local clock drivers. Each local clock driver is small enough to avoid the problems associated with parasitic capacitance.

In FIG. 1, it will be noticed that the photosensors 10 are divided into groups, and these groups are indicated as 11*a*, 11*b*, . . . 11*y*, 11*z*. (Although certain groups of photosensors toward the middle of the apparatus, such as 11*m* and 11*s*, are not explicitly shown, their existence and relative location will be inferred when they are discussed below.) In the particular illustrated embodiment, the groups 11 correspond to collinear, contiguous sets of the photosensors in the linear array, but it is conceivable that the groups could represent parallel linear arrays of photosensors, non-contiguous groups of photosensors, groups of photosensors with each group being filtered to be sensitive to a particular primary color, and/or other configurations of groups of photosensors, such as in a two-dimensional array. The various defined groups need not correspond to different silicon chips within a larger device: indeed, there is preferably a number of groups 11 on each chip in a multi-chip device.

Within each group 11, there is associated with each photosensor and its transfer circuit 14 a shift register stage 20. Each group 11 of photosensors and associated circuitry is defined by the presence of a single reset flip-flop indicated as 30. The boundaries of a particular group of photosensors, in this embodiment, are defined by the nodes where the flip-flop 30 is connected to the shift register line 22.

In the illustrated embodiment, the flip-flop 30 is of a reset type, having two inputs S and R, and an output line Q. When a pulse is received by set input S, the output Q flips high; when a pulse is received by reset input R, the output Q flips to zero. The output Q of the flip flop 30 is associated with what can be called an "enabling amplifier" 32. The enabling amplifier 32 functions when the enable input is high, and in effect passes along the clock pulse from clock like 24 onto the shift register stages 20 with which the flip-flop 30 is associated, i.e., the shift register stages 20 associated with the photosensors 10 in the group 11. When the input from flip-flop output Q is zero, however, the enabling amplifier 32 shuts off.

With reference to, for example, group 11*a* in FIG. 1, the system of the present invention operates as follows. When a digital 1 from whatever source is received on line 22 and enters the first shift register stage 20 in the Figure, the digital 1 will also cause a pulse to be created on the set input by S on the flip-flop 30 which is associated with group 11*a*. When this pulse is received, flip-flop 30 will cause output Q to go high and thereby activate the enabling amplifier 32. When amplifier 32 is enabled, the clock pulse on clock line 24 is passed to the amplifier 32 causing passing of the digital 1 through the shift register stages 20, in a sequence, within the particular group 11*a*. When the last, or in this case right hand side, shift register stage 20 is reached, the digital 1 will cause a pulse to be received by the reset input R of flip-flop 30. When this occurs, the output of flip-flop 30 will go to zero, thereby causing the enabling amplifier 32 to be disabled and effectively shutting off any activity in group 11*a*. The exit of the digital 1 from the rightmost stage 20 in group 11*a* to the leftmost stage 20 in group 11*b* will similarly create a pulse on the input S of the flip-flop 30 associated with group 11*b*, thus performing a "hand off" of the digital 1 from one group 11*a* to the next. This handoff will continue all the way through the device, in this case to the rightmost shift register stage in group 11*z*.

With reference to the terms used in the claims herein, the term "clock driver" should be construed broadly to refer to any type of hardware which enables a readout for a specific group of photosensors in a device. In the illustrated embodiment, for instance, each flip-flop 30 and amplifier 32 combination performs this function for its associated group 11*a*, 11*b*, etc. of photosensors; however, it will be apparent that different sets of hardware can perform an analogous function in devices of other designs. The term "sequencing means" should be construed broadly as any arrangement, in hardware and/or software, in which the conclusion, or near-conclusion, of readout functions of one group of photosensors causes a readout function to begin with regard to another group of photosensors. In the present embodiment this is done by the fact that a line going to the reset input of a flip-flop 30 for a first group of photosensors is near or intersects a line going to the set input of a flip-flop 30 for a second group of photosensors; once again, various arrangements to perform an analogous function will be apparent.

With particular reference to the present invention, it will be noted that, in the illustrated embodiment of FIG. 1, the groups 11*a* . . . 11*z* of photosensors each represent a contiguous subset of the entire linear array of photosensors. As mentioned above, if the entire width of the linear array corresponds to, for instance, the long edge of letter sized sheets of paper, such as 11 inches, there will be situations in which not all of the photosensors in the linear array will be outputting meaningful image data. In the letter size, long edge feed example, if a legal size sheet is fed in by its short edge, only 8.5 of the full 11 inches of the width of the scanner will be effectively used. The remainder of the photosensors will have no meaningful image data being output therefrom because they are never exposed to an image on the sheet; this "blank" image data will waste time in image output, and possibly result in meaningless data being stored in downstream memory. The problem will be more acute when relatively small original documents, such as index cards, are fed through a page-width scanner. With regard to the embodiment of FIG. 1, if the photosensors corresponding to a full width of a scanner are represented by the full set of groups of photosensors 11*a*–11*z*, a slightly smaller subset of these groups of photosensors, such as 11*a*–11*s*, will be required when feeding legal paper by its short edge, while if index cards are being fed perhaps only the groups 11*a*–11*d* will be required. It is an object of the present invention to be able to selectably activate and inactivate subsets of photosensors so that only enough photosensors 10 as required for a particular scanning job will output meaningful image data. (The above discussion applies whether or not reductive optics are used, i.e., if an effective width of 11 inches is optically reduced to expose a photosensitive chip of only about 2 inches in width, or if the device itself is 11 inches wide with no reductive optics. The discussion also applies if the scanner hardware is side registered or center registered when smaller than full-width sheets are fed through the apparatus: this will merely affect which groups of photosensors 11 are desired to be inactivated.)

In the illustrated embodiment of the present invention, the ability to selectably activate only certain subsets of photosensors in the array is carried out as follows. As shown in FIG. 1, each individual group 11 of photosensors in the array ultimately corresponds to what is called an "enabling control" indicated as 40. Each enabling control 40 effectively operates one corresponding group of photosensors such as 11*a* or 11*b*. In turn, each enabling control 40 accepts as an input a start address, which enters each control 40 through a bus 42, and a stop address, which enters each a enabling control through bus 44. The start and stop addresses enter the various enabling controls 40 of the array from an outside source of information, such a machine control (not shown). The stop and start addresses, in this embodiment, represent the boundaries of a subset groups of those photosensors which are desired to the used in a particular situation. For example, if the original documents being scanned are of a size which corresponds to group 11*a* to group 11*s*, the code representing group 11*a* will be entered as the start address on bus 42 while a code symbolic of group 11*s* will be entered as the stop address on bus 44. In this embodiment of the present invention, each enabling control 40, based on the inputs thereto, determines whether or not it is being enabled in the particular situation, and, if it is being enabled, causes the photosensors therein to output image data onto line 12; those groups 11 of photosensors which are outside the start and stop boundaries and are thus not enabled output no signals and, in effect, do not exist for purposes of data output.

When a particular enabling control 40 corresponding to a group of photosensors 11 is selected for operation, the enabling control 40 in the present embodiment sends a high signal on a line 46 to an enabling input EN of the flip-flop 30 associated with the group of photosensors. When EN is high, the circuitry associated with the particular group 11 operates as described above, causing the amplifier 32 and associated circuitry to act as a local clock driver for the group of photosensors; when EN is low, the circuitry for that group 11 is inactivated.

Figure 2:
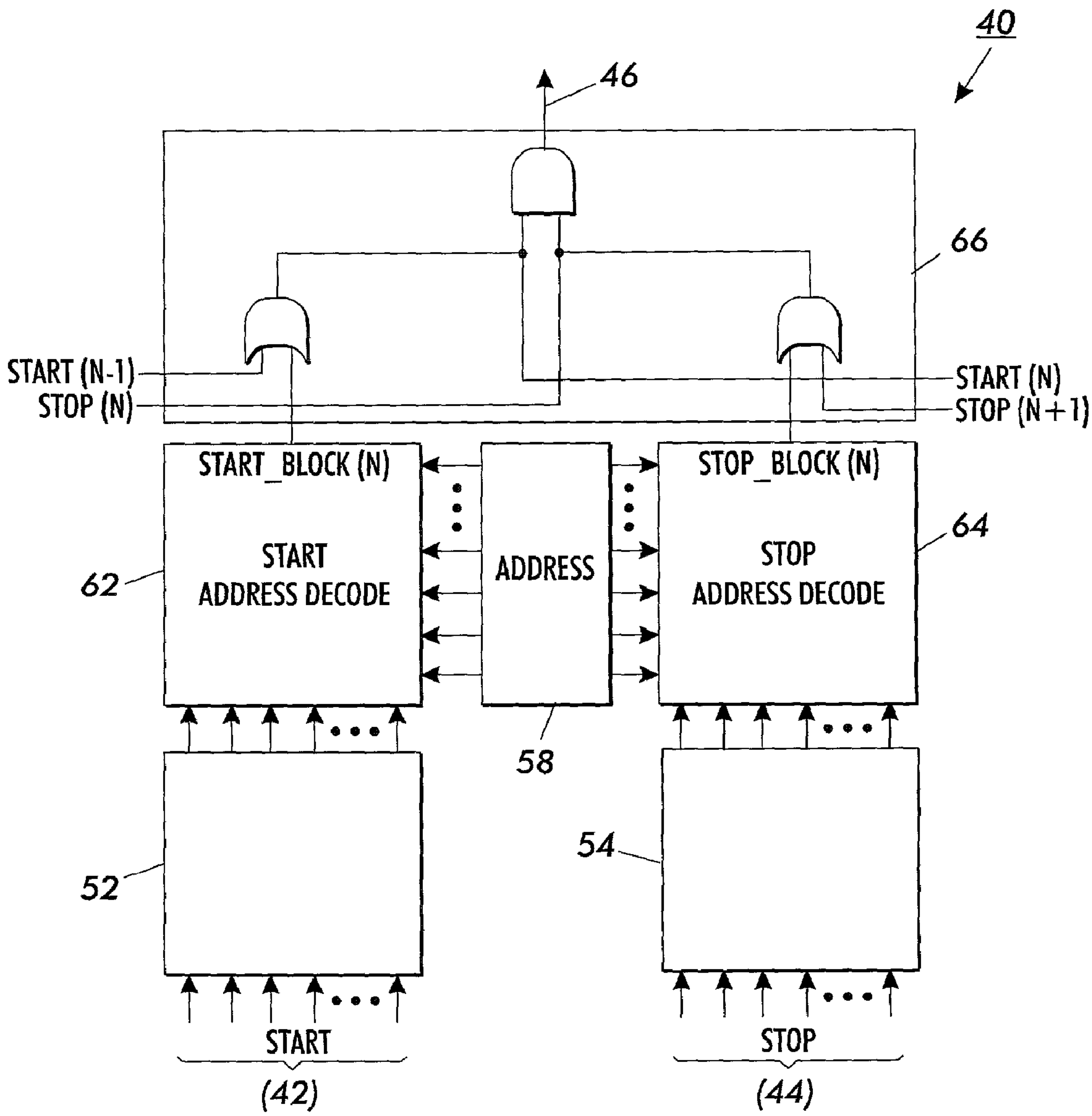
FIG. 2 is a detailed schematic view of a single "enabling control" as used in the embodiment of FIG. 1.

FIG. 2 is a schematic diagram showing, in isolation, a single enabling control 40 which would be associated with a single group of photosensors 11. As can be seen in the Figure, the inputs to the enabling block 40 are a start address entering in parallel form from the bus 42 as shown in FIG. 1, and a stop address which enters in parallel form from the bus 44 as shown in FIG. 1. With particular regard to the entry of the start address from bus 42, it can be seen that the data entering from the bus 42, which is a code symbolic of one boundary (in the view of FIG. 1, the leftmost edge) of the groups 11 of photosensors desired to be used in a particular situation, is retained at data register 52. As needed, the start address for a particular situation is entered into a decoding circuit 62. Also entered into decoding circuit 62 is a group address retained in a register 58. This group address is a number symbolic of the location of the particular associated group of photosensors 11 within the larger scanning apparatus. The group address can thus be compared to the start address retained in decoding circuit 62, and as such can be used as a numerical comparison to determine whether the particular group of photosensors identified by the code in register 58 is or is not the starting (leftmost) group of photosensors for the desired subset of groups of photosensors to be used. Similarly, the stop address, meaning the location of the rightmost group of the subset of groups of photosensors desired to be used, is entered into register 54, and then loaded into decoding circuit 64, where once again the stop address is compared to the group address from register 58. If the group address is between the start address and the stop address, the particular group will be within the subset of groups desired to be activated. By means of these comparisons of the group address in register 58 with the input start address and stop address in each enabling control 40, a particular group of photosensors associated with the block address can determine whether it is within the desired subset of photosensors for a particular scanning purpose.

Further in the illustrated embodiment, the decoding circuits 62 and 64 respectively have as outputs lines which go high if the input start or stop address is equal to the input block address in register 58. These inputs, in turn, are sent to what can be called "logic" 66 within each enabling control, the final output of which is a signal on line 46, which, as mentioned above, determines whether the associated group of photosensors is to be activated. Also serving as inputs to logic 66 are lines from the logic associated with immediately neighboring groups of photosensors (if the control 40 shown in the Figure is identified as N, as in start(N), the neighboring controls are identified as N−1 or N+1 as shown), so that the sets of logic associated with a series of groups of photosensors are chained together, as shown. The function of this chaining of logical inputs is to facilitate activation of a contiguous subset of groups 11 of photosensors between and including the identified start and stop groups 11.

Also shown in the embodiment of FIG. 2, associated with each block 11 of photosensors, is a set of gates generally indicated as 68. These gates interact with two additional lines, indicated as shift register lines SRIN and SROUT. In brief, in the illustrated embodiment, these shift register lines perform an equivalent function as the basic shift register line 22 described in the simple readout case described above in reference to FIG. 4: a digital 1 travels along both lines during readout as dictated by the logic embodied in gates 68. The digital 1 is common to all groups of photosensors because any group could be the start or stop group. A signal on SRIN initiates the reading of video signals, while SROUT indicates the end of the video. In a multi-chip array, the SROUT signal from one chip during readout serves as the SRIN for the next chip. The illustrated gate arrangement facilitates proper interaction of the SRIN and SROUT signals with flip-flop 30.

Figure 3:
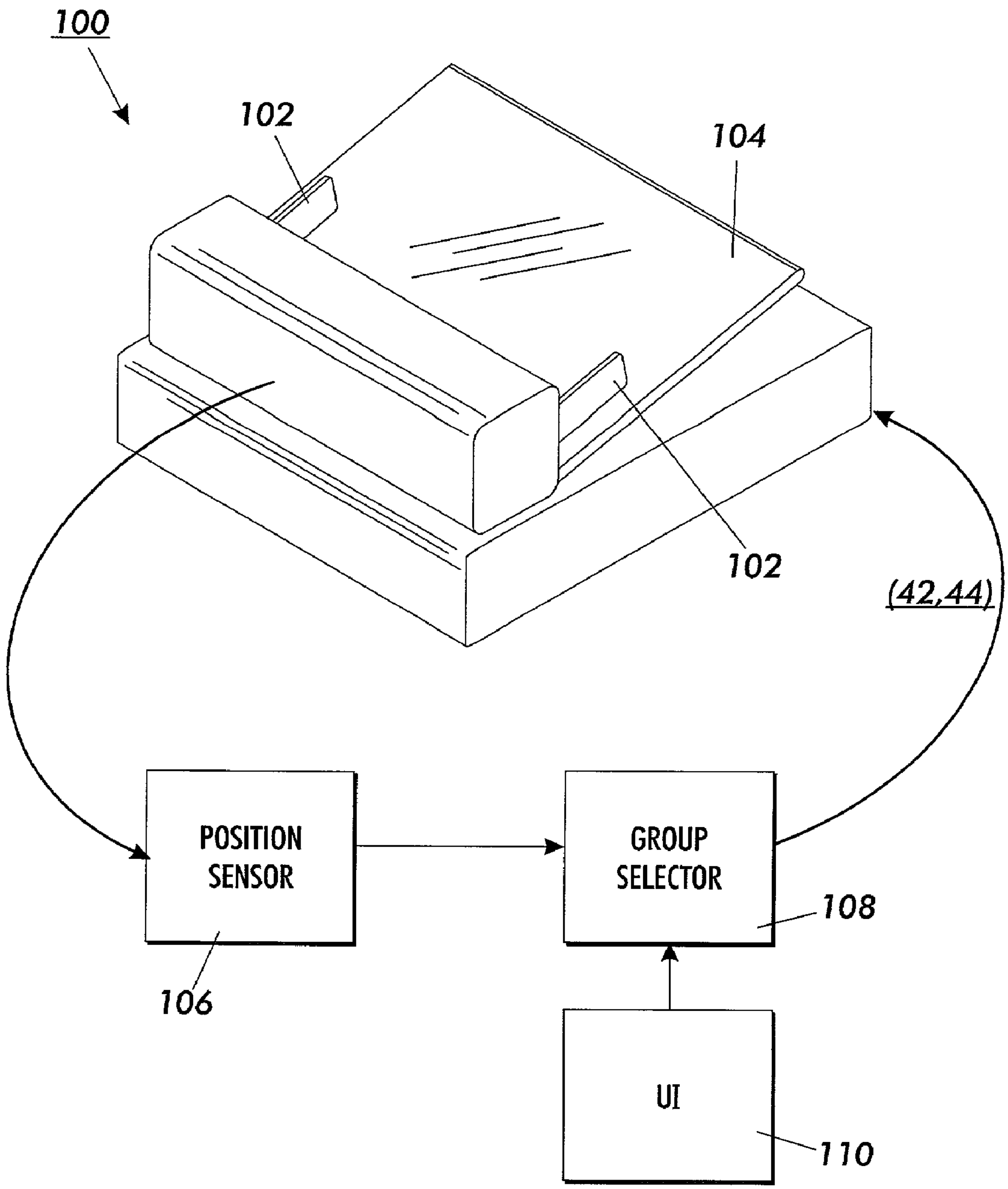
FIG. 3 is a simplified perspective view of a document holder used in conjunction with a scanner according to the present invention.

FIG. 3 is a simplified perspective view of a document handler of a general configuration well known in the art, showing how such a document handler can be used in conjunction with the systems shown in FIGS. 1 and 2. The document handler shown in the Figure, indicated generally as 100, includes, according to one aspect of the present invention, a guide for holding sheets which are to be moved relative to the photosensor array within the device, such as shown in FIG. 1, thereby recording images on a sheets in a familiar manner. In the particular illustrated embodiment, guides 102 are mounted near a tray 104 which holds sheets desired to be scanned. The guides 102 are adjustable in position to conform to the edges of a stack of sheets placed on tray 104. As is generally known with document handlers, such as in copiers and facsimile machines, the guides 102 are of different configurations depending on whether the scanning system is center-registered or edge-registered. If the system is center-registered, the guides 102 ensure that the sheets originate from a position which is centered relative to the path of sheets passing through the document handler 100; in such a case, there will typically provided two such guides, which move in a complementary fashion to center the sheets. If the system is side or edge registered, there is typically only one guide, which conforms to one edge of the stack, with the opposite edge of the stack being urged against a fixed surface.

With reference to the present invention, there is provided, associated with the movable guide or guides 102, a position detector indicated generally as 106, and which can be of any type apparent in the art, such as including optical detectors, mechanical detectors, and so forth. The function of the position detector 106 is to detect the position of the guides 102, and thereby determine the width and/or position of the sheets moving relative to the array of photosensors. By detecting the width and position of the sheets, it can readily be determined which groups of photosensors along the linear array are to be activated, and which need not be activated as the sheets are not passing relative thereto. The "group selector" indicated as 108 by can be in the form of a quantity of software allied with the general control system of the scanner, facsimile, or digital copier, and operates to select the suitable groups of photosensors for activation in response to the detected position of the guides 102. The output of group selector 108, in a particular scanning situation, is the addresses of the start and stop groups of photosensors 11, which are sent to buses 42 and 44, which cause operation of the scanner in the manner described above.

Also shown in the Figure is a user interface 110 which can be used in lieu of the position detector 106 for allowing a manual selection of which photosensors are to be activated along the array. Such manual selection may be useful in a situation where, for example, it is known in advance that image data of interest occupies only a small portion of each sheet being fed; for example, if it is known in advance that the sheets include relatively wide margins around the useful information thereon. Such a selection of only a subset of the total image data on sheets may be useful in, for instance, high-volume scanning situations, where speed and/or memory consumption is at a premium.

Although the illustrated embodiment of the invention is directed toward use of a linear array of photosensors in the office-equipment context, the claimed invention can also be embodied in the context of digital cameras, such as having two-dimensional arrays of photosensors. In such a case, use of a plurality of local clock drivers for various groups of photosensors within the array (the groups being arranged as rows, as two-dimensional blocks, or in some other manner) can facilitate some groups of photosensors being sampled at a rate different from the rate others are sampled, by closely controlling the clock drivers associated with individual blocks. This principle may be particularly useful in the context of security cameras, where the camera is directed at a scene (such as a room) which is largely static but where possible motion is likely to occur in a known place (such as at a door). This ability to vary the sampling rate of different portions of an image can result in savings to memory consumption and increase in data output rate.

What is claimed is:

1. A photosensitive apparatus, comprising:

a plurality of photosensors forming a linear array, the photosensors being organized in a set of groups of photosensors, each group forming a contiguous block of photosensors along the linear array;

a video output line, for accepting image-related video signals from the photosensors; and selection means for activating a subset of groups of photosensors so that only the activated subset of groups of photosensors outputs image signals onto the video output line to record an image, thereby activating photosensors along only a contiguous portion of the linear array.

2. The apparatus of claim 1, the groups of photosensors being arranged as a linear array of photosensors.

3. The apparatus of claim 1, the selection means including an enabling control associated with each group of photosensors, the enabling control receiving a code relating to whether the associated group of photosensors is to be activated, and enabling the group of photosensors to output image signals if the associated group of photosensors is to be activated.

4. The apparatus of claim 3, the enabling control including address receiving means for receiving a code relating to a subset of groups of photosensors to be activated.

5. The apparatus of claim 3, the enabling control including means for determining whether the group of photosensors is within the subset of groups of photosensors to be activated.

6. The apparatus of claim 1, further comprising a plurality of local clock drivers, each local clock driver activating a group of photosensors.

7. The apparatus of claim 6, the selection means including an enabling control associated with each group of photosensors, the enabling control receiving a code symbolic of whether the associated group of photosensors is to be activated, and enabling the local clock driver associated with the group of photosensors if the associated group of photosensors is to be activated.

8. The apparatus of claim 6, each group of photosensors having associated therewith a plurality of shift register stages, each shift register stage being associated with at least one photosensor.

9. The apparatus of claim 8, further comprising sequencing means for causing a second local clock driver to begin sequentially activating a plurality of shift register stages within its group of photosensors, as a result of a first local clock driver finishing activating a plurality of shift register stages within its group of photosensors.

10. The apparatus of claim 9, the sequencing means comprising a flip-flop associated with the first local clock driver, the flip-flop having a set input associated with a first shift register stage in the group of photosensors, and a reset input associated with a last shift register stage in the group of photosensors.

11. An apparatus for recording images from a sheet, comprising:

a linear array of photosensors arranged in a linear array, each photosensor being selectable to output a video signal;

means for moving a sheet relative to the linear array of photosensors; and selection means for selecting a subset of photosensors in the linear array for recording an image on the sheet, each subset of photosensors forming a contiguous block along the linear array, so that only photosensors forming a contiguous portion of the linear array output video signals.

12. The apparatus of claim 11, further comprising at least one video output line for accepting image-related video signals from the photosensors; and the selection means activating a subset of groups of photosensors so that only the activated subset of photosensors outputs image signals onto the video output line to record an image.

13. The apparatus of claim 11, further comprising a movable guide member conforming to at least one edge of a sheet moving relative to the linear array of photosensors; and a position detector for detecting a position of the movable guide member;

the selection means being responsive to the position detector.

14. The apparatus of claim 11, the linear array of photosensors comprising a set of local clock drivers, each clock driver being operative of a group of photosensors In the linear array; and the selecting means activating at least a subset of local clock drivers to select a subset of photosensors in the linear array.

15. A photosensitive apparatus, comprising:

a plurality of photosensors, the photosensors being organized in a set of groups of photosensors;

a video output line, for accepting image-related video signals from the photosensors;

selection means for activating a subset of groups of photosensors so that only the activated subset of groups of photosensors outputs image signals onto the video output line to record an image;

a plurality of local clock drivers, each local clock driver activating a group of photosensors;

a plurality of shift register stages, each shift register stage being associated with at least one photosensor; and sequencing means for causing a second local clock driver to begin sequentially activating a plurality of shift register stages within its group of photosensors, as a result of a first local clock driver finishing activating a plurality of shift register stages within its group of photosensors, the sequencing means comprising a flip-flop associated with the first local clock driver, the flip-flop having a set input associated with a first shift register stage in the group of photosensors, and a reset input associated with a last shift register stage in the group of photosensors.

* * * * *